United States Patent [19]

Lange

[11] 4,120,666

[45] Oct. 17, 1978

[54] HOLLOW CORE SYNTHETIC FIREPLACE LOG AND METHOD AND APPARATUS FOR PRODUCING SAME

[76] Inventor: Steven R. Lange, 8355 Quay Dr., Arvada, Colo. 80003

[21] Appl. No.: 698,259

[22] Filed: Jun. 21, 1976

[51] Int. Cl.² ............... C10L 5/00; C10L 5/36; C10L 5/22

[52] U.S. Cl. ............... 44/10 R; 44/13; 44/14; 44/24

[58] Field of Search ............... 44/13, 14, 24, 38, 41, 44/10 R

[56] References Cited

U.S. PATENT DOCUMENTS

| | | | |
|---|---|---|---|
| 1,926,578 | 9/1933 | Brown et al. | 44/1 R |
| 3,880,611 | 4/1975 | Weiss | 44/14 X |
| 3,973,922 | 8/1976 | Williams | 44/13 |

*Primary Examiner*—Carl Dees
*Attorney, Agent, or Firm*—James R. Young; John E. Reilly

[57] ABSTRACT

This invention is directed to a synthetic fireplace log with a hollow core, said log being composed of shredded paper and wax. The logs are produced by continuously compacting shredded paper into one end of a compaction chamber, injecting hot molten wax into the compacted paper in the compaction chamber, cooling and hardening the wax, and continuously extruding finished logs from the opposite end of the compaction chamber with means for cutting the continuously extruded log into convenient lengths.

21 Claims, 3 Drawing Figures

HOLLOW CORE SYNTHETIC FIREPLACE LOG AND METHOD AND APPARATUS FOR PRODUCING SAME

BACKGROUND OF THE INVENTION

The present invention relates to novel and improved synthetic logs for fuel and to a method and apparatus for producing same; and more specifically relates to a synthetic fireplace log composed of paper and wax for use as a fuel in fireplaces.

The concept of forming synthetic fireplace logs from a raw material composed primarily of paper is not a new development. The U.S. Pat. Nos. 2,475,766 issues to R. O. Williams, 2,475,769 issues to R. O. Williams and 3,744,980 issued to F. B. Harris disclose the use of ground or pulverized paper in the manufacture of synthetic logs, and the U.S. Pat. No. 1,926,578 issued to E. T. Brown indicates the use of shredded paper as the primary ingredient in artificial fuel blocks and briquettes with crude oil or fuel oil mixed with wood spirits and crude rubber used as a binder. However, the prior art of combining shredded paper and wax to form a fireplace log has not been thoroughly successful and remains economically questionable. The above-cited patents to Williams which utilizes ground paper laments the unsatisfactory results stemming from the use of shredded or "straight cut" particles of paper. Also, of the above-cited patents, only Harris discloses the use of a wax binder in combination with paper; however, the apparatus and method for use of a wax binder in the present invention is far superior and more economical with the additional advantage of being practical and successful with shredded paper. Further, a remaining fundamental concern is to produce a synthetic fireplace log with good burning characteristics. The burning characteristics required include that of having a log that will sustain a flame without extinguishing itself; yet the log should not burn so vigorously or rapidly as to be completely consumed to a short period of time. It is therefore desirable to have a synthetic fireplace log that can be economically produced, easily ignited and will burn steadily for a period of approximately three hours before it is completely consumed. It is also desirable to provide a log that is safe to use and which leaves a minimum of ash remaining after burning.

SUMMARY OF THE INVENTION

The synthetic fireplace log of the present invention is composed primarily of shredded paper and wax. The particles themselves are shredded strips approximately ⅛ inches to ½ inches in width and 3 inches to 9 inches in length, although virtually any length can be successfully used, especially with a screw-type compactor apparatus. Shredded paper comprises approximately 32 to 45% of the weight of the log, and wax comprises the remaining 55% to 68% of the weight. The wax is added as a binder to maintain the shredded paper in the shape of a fireplace log. In addition to the binding provided by the wax, the elongated particles of shredded paper are entangled and enmeshed with each other to increase the structural rigidity and integrity of the log throughout the burning process. Thus, the log is safe to use since it resists disintigration and can be handled and moved about with fireplace tongs even while burning.

The shredded paper itself is a combustible material, and the wax, also being a combustible material, assists in sustaining a flame. However, since the shredded paper is tightly compacted and bound into a log of substantial diameter, for example, on the order of 3 to 6 ½ inches, the log is manufactured with a hollow core through its longitudinal axis to provide sufficient oxygen to sustain a controlled burning rate over a predetermined period of time and to preclude the possibility of extinguishing or unduly retarding the flame owing to a lack of oxygen in the very tightly compacted paper.

The improvement in the apparatus for producing and manufacturing the fireplace log of the present invention includes means for compressing and advancing the paper into a chamber, means for injecting hot molten wax into the chamber to thoroughly penetrate the compacted shredded paper while continuously advancing the log and forming a hollow core through its longitudinal center. Means are also provided for cooling and dividing the resultant product into synthetic logs of predetermined length. The present invention also includes a method of manufacturing synthetic fireplace logs composed primarily of shredded paper and wax in a continuous extrusion process. More specifically, the method of the present invention is characterized by continuously feeding shredded paper into a compaction chamber which is sized and shaped to define the form of the resulting finished synthetic log and having means therein to form a hole through the longitudinal center of the log, injecting hot molten wax into the shredded paper while it is in the compaction chamber, cooling the wax in the compaction chamber, and continuously extruding a finished synthetic log product from the opposite and of the compaction chamber.

Accordingly, it is an object of the present invention to provide a novel and improved synthetic fireplace log composed of shredded paper and wax which can be readily ignited and will sustain a flame for a prolonged period of time, and which leaves only a minimal amount of ashes or residue remaining after the log is comsumed by fire.

It is another object of the present invention to provide an improvement in the presently existing apparatus for producing synthetic fireplace logs as described above, said improvement including an apparatus for injecting hot molten wax directly into a compaction chamber containing the compacted shredded paper in such a way as to thoroughly penetrate the paper.

It is yet another object of the present invention to provide an improvement in synthetic log manufacturing apparatus whereby the hot molten wax can be immediately cooled and hardened after injection into the shredded paper with no additional handling of the paper and wax material.

It is still another object of the present invention to provide an improvement in the existing synthetic log producing apparatus whereby a synthetic fireplace log can be produced with a hole or hollow core thoughout its entire length at its longitudinal axis.

It is still a further object of the present invention to provide an apparatus in which shredded paper can be continuously fed into a compactor for compaction into one end of a compaction chamber, wax can be continuously applied to the compacted paper and cooled to harden into a rigid, synthetic log structure while continuously extruding a synthetic log structure from the opposite end of the compaction chamber, said apparatus also being provided with means for cutting the extruded log into convenient lengths.

It is also an object of this invention to provide a method of fabricating synthetic fireplace logs by continuously feeding shredded paper into a compactor, compacting the shredded paper into a compaction chamber, injecting hot, molten wax into the compacted paper as it is moving through the compaction chamber, cooling and hardening the wax while the paper continues its movement through the compaction chamber, and extruding a continuous length of finished synthetic logs out the opposite end of the compaction chamber to be cut into convenient lengths by a blade.

Another object of the present invention is to provide a method of producing synthetic fireplace logs with hollow cores at their centers by compacting shredded paper into a compaction chamber and around a shaft positioned along the longitudinal axis of the compaction chamber.

Still another object of the present invention is to provide a fast and economical method of continuously extruding synthetic fireplace logs with optimum burning characteristics and with additional coloring and aromatic additives to produce colored flames and pleasing aroma simultating natural wooden fireplace logs.

An additional object of the present invention is to provide a synthetic fireplace log comprised of elongated shredded paper particles entangled and enmeshed with each other and bound together by wax which is rigid in structure and safe to handle and move about, even while burning.

BRIEF DESCRIPTION OF THE DRAWINGS

Other objects, advantages and capabilities of the present invention will become more apparent as the description proceeds taken in conjunction with the accompanying drawings, in which.

DETAILED DESCRIPTION OF THE PREFERRED EMBODIMENT

Figure 1:
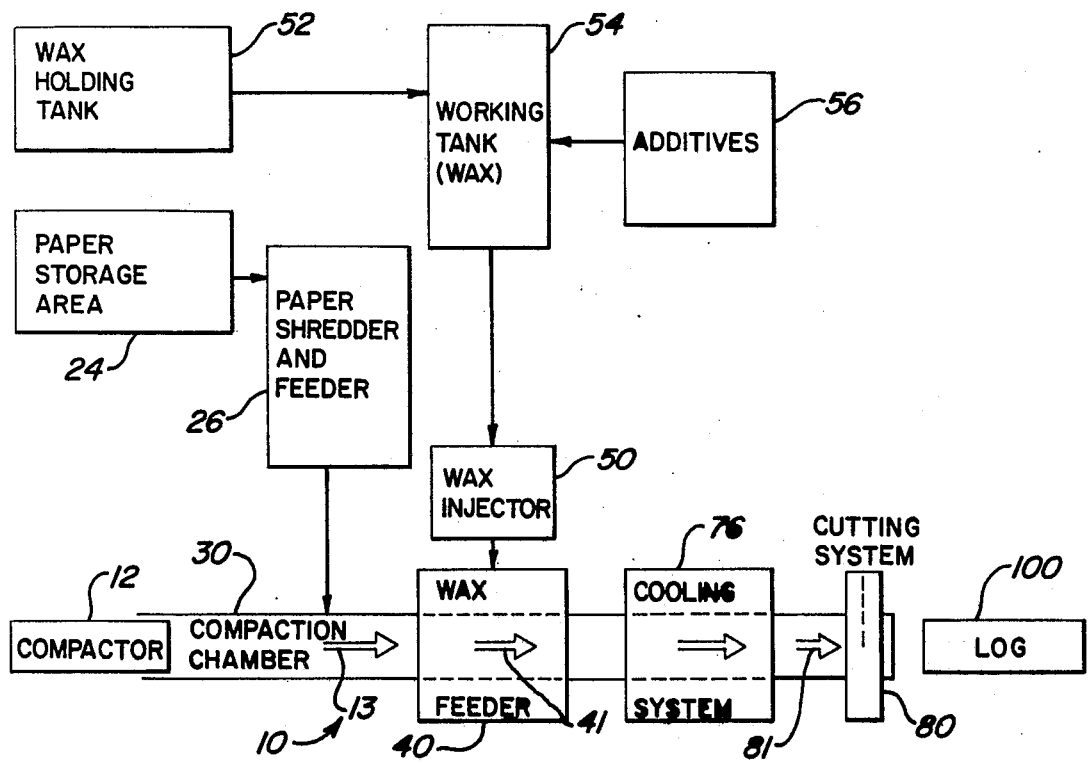
FIG. 1 is a schematic diagram showing the component elements and sequence of steps in producing synthetic fireplace logs.

The preferred method of the present invention for producing synthetic fireplace logs involves the use of an extruder apparatus 10 with a compactor 12 and a compaction chamber 30 arranged on a common longitudinal axis. The method is best summarized by reference to FIG. 1 where paper is moved from the storage area 24 into a paper shredder 26. The paper is shredded into strips ¼ inch wide and approximately six inches in length and fed into the compaction chamber 30 of an extruder apparatus 10. The compactor 12 compacts the shredded paper into the compaction chamber as indicated by the arrow 13. The shredded paper is continually moved from the compaction chamber 30 into the wax feeder area 40 of the compaction chamber as indicated by arrow 41 where hot, molten wax is injected into the compacted, shredded paper.

The wax is delivered by suitable conducting means from a holding tank 52 where it is stored at a temperature sufficient to keep the wax in a molten state to a working tank 54 where additives 56 can be combined with the wax under additional heat, and the wax is prepared for injection into the paper. The wax is then drawn from the working tank 54 into a wax injector 50 where it is injected under pressure into a wax feeder section 40 of the compaction chamber 30. From the wax feeder 40, the hot molten wax is injected under pressure into the compacted shredded paper as it is advanced through the compaction chamber 30 so as to become internally mixed together.

The compacted paper and wax then moves into a cooling system area 76 of the compaction chamber 30 as indicated by the arrow 77 where the hot molten wax is cooled and hardened. It is in this cooling area 76 that the shredded paper and wax acquires the integrity of a rigid, homogenous synthetic fireplace log. From the cooling area 76, the log moves through the compaction chamber as indicated by arrow 81 through the cutting system 80 where the continuously extruded synthetic fireplace log is cut into convenient lengths producing individual log segments 100.

Figure 2:
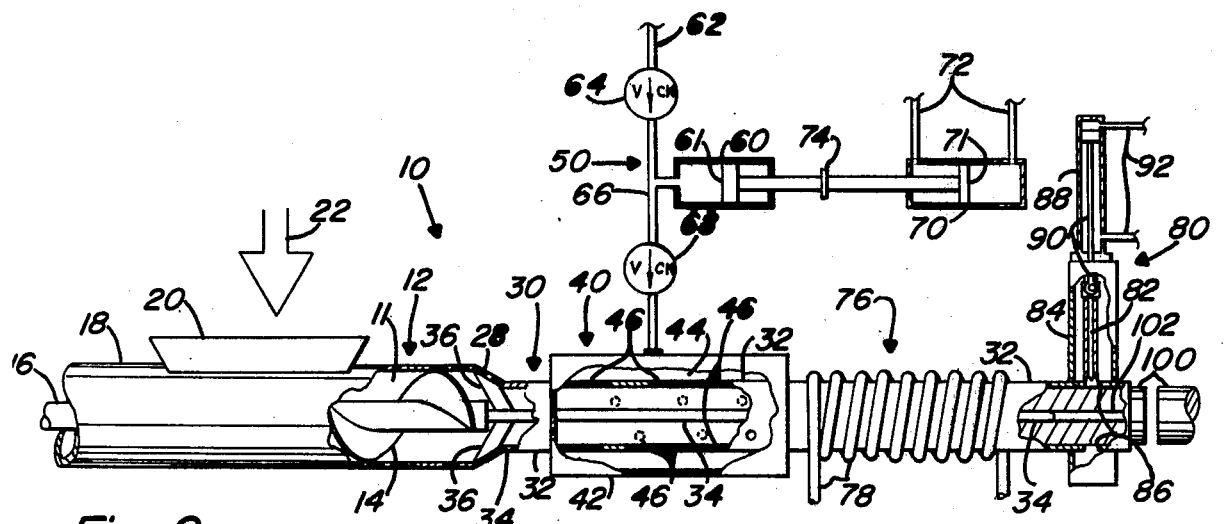
FIG. 2 is an enlarged, detailed elevational view of the extruding apparatus for producing synthetic fireplace logs with portions of the exterior cut away to reveal detailed internal structure, and with the hydraulic cylinders, wax pipes and valves shown schematically.

A more detailed understanding of the method and apparatus used for producing the synthetic fireplace logs can be obtained by reference to FIG. 2. The extruder apparatus 10 includes the compactor 12 and the compaction chamber 30. The compactor 12 shown in FIG. 2 is comprised of an auger or screw 14 mounted on drive shaft 16 which is journaled for rotation within the screw tubing or housing 18. A hopper 20 is provided at the inlet end of the screw housing 18 for feeding shredded paper 11 into the compactor 12 through the hopper 20 as indicated by arrow 22. The screw 14 conveys the paper 11 from the hopper 20 and forces it under pressure through a discharge tube 32 of reduced size leading into the compaction chamber 30. The size of the shredded particles of paper is not critical but it has been found that paper strips approximately ⅛ inches to ½ inches wide and two to nine inches in length are quite satisfactory. Longer strips of paper can also be easily accommodated since the rotating screw 12 tends to tear the paper strips and otherwise successfully compresses them into compacted relation to one another in the compaction chamber 30. It can be appreciated that a reciprocating ram compactor can be substituted for the screw compactor as a choice of design.

The compaction chamber 30 is preferably defined by the elongated cylinder or tube 32 of circular cross-section; however, it is recognized that other variations in the cross-sectional design of the compaction chamber could also be used successfully depending upon the desired finished configuration of the synthetic fireplace logs being produced. The cross-sectional area of the compaction tube 32 is smaller than the cross-sectional area of the screw 14 and screw housing 18. The discharge end of the housing 18 is defined by a convergent wall section 28 connected to the screw housing 18. Consequently, as the shredded paper 11 is conveyed by the screw 14 into the section 28 and finally into the compaction tube 32, it is compacted into the reduced cross-sectional area of the tube 32. The forcing of the shredded paper 11 into the reduced cross-sectional area of the tube 32 combined with the frictional resistance to sliding movement of the shredded paper through tube 32 results in the shredded paper being forced into and retained in a highly compacted state with a signficantly increased density.

As the screw 14 continues to feed more shredded paper 11 into the compaction chamber 30, the compacted paper moves through compaction tube 32 into the area of the compaction chamber 30 designated as the wax feeder area 40. In this wax feeder area 40, hot molten wax is injected into the compacted shredded paper continuously advancing therethrough. The wax feeder 40 includes an outer concentric sleeve 42 mounted and sealed at both ends on the compaction tube 32. The space between sleeve 42 and compaction tube 32 defines an injection chamber 44 completely enclosing a portion of the compaction chamber 30. Holes in the compaction tube 32 defining delivery ports 46 provide communication between the injection chamber 44 and the interior of the compaction chamber 30 for injection of the molten wax at spaced intervals into the compaction chamber.

Hot, molten wax prepared with the desired additives 56 is drawn from working tank 54 and injected under pressure into the wax feeder 40 by the wax injector 50. The wax injector 50 is comprised of an injection cylinder 60 with injector ram 61 driven by master hydraulic cylinder 70 and master ram 71. Hydraulic fluid supply lines 72 supply alternately reversing flows of hydraulic fluid into the master cylinder 70 resulting in reciprocating motion of ram 71. Master ram 71 is connected to injector ram 61 in the injector cylinder 60 by a coupling 74. Thus it can be appreciated that the master cylinder and ram impart reciprocal motion to the injector cylinder and ram. During the backstroke of injector ram 61, molten wax is drawn from the working tank 54 through the supply pipe 62 and into injector cylinder 60. Then during the foward stroke of ram 61, the molten wax is forced under pressure through pressure pipe 66 into the injection chamber 44 of the wax feeder 40. During the backstroke of injector ram 61, check valve 68 is closed to prevent wax in the injector chamber 44 from backflowing into injector cylinder 60, while the check valve 64 opens and allows wax to flow through supply line 62 into the injector cylinder 60. Alternately, during the forward pressure stroke of injector ram 61, the check valve 64 prevents the wax from flowing under pressure backwards through supply pipe 62 into the working tank 54, while the check valve 68 is open and allows the wax to flow under pressure into the injection chamber 44. Obviously, when pressure is applied to the molten wax in injection chamber 44 by the injector ram 61, the molten wax in injection chamber 44 is forced to flow at a high pressure through delivery ports 46 into the compacted paper 11 in compaction chamber 30 thereby penetrating deeply and thoroughly into the compacted shredded paper.

It has been found that effective and thorough penetration of wax into the compacted paper 11 can be achieved by orienting the delivery ports 46 in a spiral pattern around the compaction tube 32 along a length of the compaction tube 32 correlated with the length of the synthetic log 100 being produced. The length of the zone of delivery ports along the compaction tube is significant because it is desirable to provide one pressure stroke of the injector piston 61 and thus one "spurt" of wax into any portion of the compacted paper in the compaction tube. The stroke of the injector piston 61 can be coordinated with the cutter knife 82 which will be described in more detail below. Consequently, the quantity of wax injected into any portion of the compacted paper can be precisely controlled. Each log 100 will contain the same amount of wax as the logs preceding or following it in production. As can be readily appreciated, this same result could be achieved by providing delivery ports along lengths of the compaction tube in even multiples or fractions of the length of the logs being produced. For example, one "spurt" of wax could be injected into a length of compacted paper equal to twice the length of the logs produced or equal to one-half of the length of the logs produced, but the next "spurt" would not occur until the previously waxed section of paper has moved out of the wax feeder area.

It can also be appreciated that the desired results can be obtained by providing a wax feeder area 40 with only a narrow band of delivery ports 46 around the compaction tube 32, but a fairly constant pressure would have to be maintained on the wax in the injection chamber 44, or at least the pressure strokes of injection ram 61 would have to occur in quite rapid sequence to maintain thorough penetration and coverage of the wax in the compacted paper. Also, in this embodiment, it would be necessary to maintain a constant paper feed rate to avoid variations in the relative proportions of wax content in the produced logs.

As still more shredded paper 11 is forced into the compaction chamber 30, the shredded paper and wax mixture is forced to move out of the wax feeder area 40 of the compaction chamber 30 and into the cooling system area 76 of the compaction chamber 30. In this cooling area 76 the hot, molten wax is cooled and thereby hardened. As the wax becomes cooled and hardened, the shredded paper and wax mixture takes on the integrity of a rigid, homogenous structure with a cross-sectional configuration conforming to the cross-sectional configuration of the compaction tube 32. As discussed previously, this configuration is preferably of circular cross-section; however, other desirable cross-sections can also be provided for the synthetic log. The cooling of the hot molten wax is of course accomplished by a heat transfer from the wax and shredded paper mixture through the walls of tube 32. This heat transfer is of course a function of the time required for the heat to move from the wax and paper mixture through the tube walls. Consequently, the length of the compaction tube 30 required is a function of the time required to sufficiently cool the wax into a hard, rigid structure. For economy, an artificial cooling system can be provided to reduce the time required for the necessary heat transfer resulting in a reduction in the required length of the compaction tube 32. The preferred form of this invention as shown in FIG. 2 includes the cooling tubes 78 in surrounding relation to a compaction tube 32 so as to maintain a constant flow of a cooled refrigerant fluid from a convenient heat pump or air conditioning system. Obviously, the method and apparatus of artificial cooling is a choice of design and can include the coiled refrigerant tubing 78 as shown in FIG. 2, or may include other options such as forcing cooled air over the compaction tube 32 and providing fins on the exterior surface of compaction tube 32 to increase the efficiency of the heat transfer. Cooling fluid as well as cooling tubes for accommodating the flow of cooled liquid or refrigerant can also be provided in a hollow core shaft 34 if desired to improve cooling efficiency.

After the synthetic log moves out of the cooling area 76 where it took on the integrity and structure of a synthetic log, it advances to the extreme end of the compaction chamber 30 where it is continuously extruded out of the compaction chamber 30. However, just prior to being extruded out of the end of the compaction chamber 30, the synthetic log exits through a cutting system area 80. This cutting system 80 includes a sharp blade or knife 82 driven by a hydraulic cylinder 88 and ram 90 for cutting the continuously extruded synthetic log into convenient lengths for packaging and shipping and subsequent use. The blade or knife 82 is controlled for movement through a slide mounting 84 similar to a guillotine. The cutter mounting 84 is attached to the compaction tube 32. A blade slot 86 is provided in tube 32 to accommodate the movement of the knife blade 82. The hydraulic cylinder 88 is mounted on the cutter mounting 84. The ram 90 of the hydraulic cylinder 88 is pivotally connected to the end of the knife blade 82 which is opposite to its sharp cutting end. Hydraulic fluid is provided for cylinder 88 through hydraulic lines 92. The hydraulic fluid initially drives the ram 90 and the knife 82 with quick, strong force, causing the sharp end of the knife 82 to pass through the synthetic log in a guillotine-like cutting action at a point in the compaction chamber 30 aligned with the slot 86. This movement of the knife blade 82 cuts through the synthetic log, then the direction of the hydraulic fluid flow in lines 92 is reversed and the ram 90 pulls the blade 82 out of the slots 86 in compaction chamber 30 and back into the cutter mounting 84 where it remains ready for another cycle of cutting the log.

A double-edged knife which is not new in the art, could also be used wherein one length of log would be cut by the bottom edge of the knife in a downward stroke in which the entire knife blade would travel through the log and remain on the opposite side until an additional length of log is extruded, whereupon the knife blade would be drawn upwardly through the log cutting with its top edge as it returns to the starting position for another cycle. It can also be appreciated that alternate cutter embodiments can also be employed such as a band saw or other similar devices.

Figure 3:
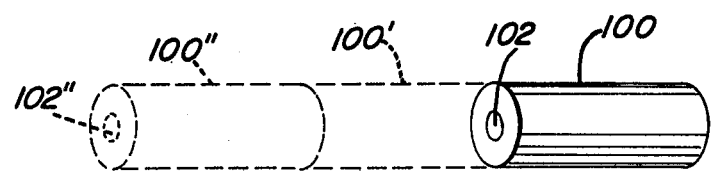
FIG. 3 is a perspective view of a finished, cut synthetic fireplace log with additional logs being shown in phantom lines to illustrate the continuous extrusion of fireplace logs prior to cutting.

The cutter can be controlled manually, with timing devices, or with sensing apparatus that measures the length of the extruded logs. In this way, synthetic logs composed essentially of shredded paper and wax can be continuously extruded and cut automatically into convenient lengths. The finished synthetic fireplace log 100 is shown in FIG. 3. Additional lengths of the log are shown at 100' and 100" in phantom lines to illustrate the continuously extruded span of the log. The ventilating hole 102 defines a hollow core of the log 100 throughout the entire length of its longitudinal axis.

In the preferred embodiment, the cutter cycle is determined by the length of log section to be cut as the wax-impregnated, compacted paper is extruded from the compaction tube 32. In turn, the length of the injector ram stroke is correlated with the timing of the cutter cycle or stroke so that the amount of wax injected into the wax feeder sleeve 40 for each cycle will correspond to the length of section to be cut. Correspondingly, the length of the sleeve 40 may be varied in accordance with the length of section to be cut by the cutter. In this relation, the wax injector and the cutter cycles can be simultaneously controlled by the same sensing or timing device, such as, for example a double-acting hydraulic valve. If an embodiment with a ram compactor, rather than a screw compactor is used, the strokes of the ram compactor could also be coordinated in both length and time with the coordinated components described above.

Since the shredded paper is tightly compacted and bound together with wax, there may not be enough oxygen in the paper log to support a continuous flame if the log had a solid cross-sectional configuration. Consequently, the ventilating hole 102 is provided throughout the length of the log to supplement the oxygen supply available in the log so that the log will burn continuously at a slow but steady rate until the log is completely consumed. The ventilating hole 102 is formed in the continuously extruded log while it is in the compaction chamber 30. As best seen in FIG. 2, a core shaft 34 is suspended in the center of the compaction chamber 30 along a portion of the length of the longitudinal axis of compaction tube 32. In the preferred embodiment, the core shaft 34 is defined by an extension of drive shaft 16 without auger flighting into the compaction chamber 30, or the core shaft 34 can be retained in that position by mounting brackets 36 with one end of the core shaft 34 extending into or near an end of the drive shaft 16 of screw 14, as shown in FIG. 2. Although it is not essential, in the latter embodiment a bearing can be provided on this end of the core shaft 34 for journaled mounting of the end of the drive shaft 16 onto the core shaft 34 for additional support.

In an embodiment utilizing a ram compactor rather than a screw compactor, this end of core shaft 34 could simply be tapered or rounded to provide the least resistance to the flow of shredded paper, or the ram could glide on a core shaft extending through its center. The core shaft 34 extends through both the wax feeder area 40 and the cooling system area 76 of the compaction chamber 30, its opposite end terminating at some point between the cooling system area 76 and the cutting system 80 so as not to interfere with the movement of the blade 82 through the compaction tube 30.

Another embodiment would include providing support for the forward end of the core shaft 34 by a non-rigid connection of said forward end of the core shaft 34 to the drive shaft 16 wherein the remaining length of said core shaft would be supported along the longitudinal axis of compaction tube 32 by the compacted paper 11 in the compaction tube 32.

As can be appreciated, as the screw 14 forces and compacts the shredded paper 11 into the reduced diameter of the compaction chamber 30, the compacted paper 11 is forced into the compaction tube 32 around the core shaft 34. That form is maintained through the wax feeder area 40 and the cooling system area 71 of the compaction chamber 30. As described above, the synthetic log takes on the integrity of a rigid structure while in the cooling system area 76, and it retains that structure upon emerging from the cooling system area. Consequently, as the synthetic log slides over the end of core shaft 34 just beyond the cooling area 76, the void in the core of the compacted paper and wax mixture formed by the core shaft 34 is retained in the finished synthetic log to define the ventilating hole 102.

For purposes of illustration and not of limitation, the following information is provided to further assist in the use of the method and apparatus to produce a synthetic fireplace log as described in this invention. Suitable wax is available from most major oil refiners. For example, Chevron Oil Company sells a wax called Altamont Log Wax, and Continential Oil Company sells a wax designated as Code 775 HI Petroleum. The wax can be stored in a fluid state in the holding tank 52 at a temperature of about 165° F. Gravity is adequate to transfer the wax from the holding tank 52 to the working tank 54, although a pumping system can be used if desired. The working tank 54 can be used to combine additives and to provide additional heat to prepare the wax misture for injection into the compacted paper. A suitable temperature range for injection of the wax into the compacted paper is 175° F. to 200° F. Such additives as coloring and aromatic materials can be used. The coloring additives can be of two types: the first type would provide a suitable coloring to the appearance of the log. The second type could be a flame coloring chemical that reacts chemically to provide a suitable color for the flame when the log is burning. Two of these flame coloring chemicals in general use are copper sulphate and ammonium chloride. The aromatic additives could be provided to impart an aroma to the fumes of the burning log, for example, the aroma of burning pine.

Most paper, particularly the absorbent type, should be satisfactory for use and should provide adequate characteristics when shredded to specification. For example, dry newsprint is satisfactory when shredded into widths of ¼ inch with lengths of 6 inches or less. It should be noted, however, that the length of the shredded paper used is not critical, particularly when a screw-type compactor is used, since the mechanical turning and tumbling is sufficient to tear up the shreds of paper, entangle and enmash them together, and conform them into compacted position in the compaction chamber. The moisture content should be maintained at less than 10%. Although it is contemplated that shredded paper is the primary bulk ingredient for the manufacture of synthetic logs according to this invention, it has been found that relatively small additional quantities of ground or pulverized paper can be added to vary the burning characteristics of the finished log. For example, increased quantities of pulverized paper combined with the shredded paper will retard the rate of burning of the log.

It has been found that suitable logs with desirable burning characteristics can be manufactured with circular cross-sectional diameters of approximately 3 inches to 6½ inches and with ventilating holes of from ½ inch to 1½ inches depending on the diameter of the log.

The wax feeder has been successfully used when fabricated from a 6 inch inside diameter pipe 15 inches in length encompassing the compaction chamber and sealed at both ends around the compaction tube 30. As can be appreciated, the penetrating pressure and velocity of the pressurized wax flowing through the delivery ports 46 into the compacted paper 11 within the compaction chamber 30 may be varied according to the number of delivery ports provided. With only one port having a diameter of 0.03 inch to 0.09 inch, the pressure of the wax escaping from the injection chamber 44 into the compaction chamber 30 is greater than with an increased number of ports but will severely limit to area of distribution of the wax. It will be appreciated however that the continuous flow of paper through the chamber will greatly aid in distribution and penetration of the wax. It has been found that approximately sixteen to twenty delivery ports are satisfactory for uniformly injecting the proper amount of wax with acceptable penetration into the compacted paper.

Of course, it must be recognized that several variables must be coordinated to produce optimum results. These variables include the extent of the pressure utilized to compact the paper, the wax pressure provided by the wax injector 50 and the size and number of delivery ports 46 provided in the wax feeder 40, as well as the temperature of the wax and the velocity of the compacted paper moving through the compaction chamber 30. Of course, it can also be appreciated that the type and capacity of the cooling system 76 must also be coordinated with the variables of the system utilized, such as the velocity of the compacted paper through the compaction chamber, the temperature of the wax, the length of the cooling area, and the ambient temperature of the atmosphere and the heat transfer characteristics of the materials used.

As the log section is extruded from the compaction chamber, it can be cut into approximately 16 inch lengths. It can be 3 inches to 6½ inches in diameter with a hollow core of approximately ½ inch to 1½ inches in diameter. The volume of shredded paper required will vary with the diameter of the log desired. A desirable log weighs approximately 96 to 108 ounces with a wax base of less than 68% by weight. Accordingly, the weight of the paper is desirable at levels above 32% of the weight of the log. The volume of paper has a direct correlation to the capacity of the compaction chamber and the density of compaction. For instance, it has been found that shredded paper newsprint will easily compact to a density of approximately 0.143 ounces per cubic inch. The finished fireplace log with both wax and paper has a density of approximately 0.350 to 0.400 ounces per cubic inch.

Desirable paper/wax ratios for a 96 ounce log would include approximately 43.13 ounces of paper or approximately 44.9% by weight and approximately 52.87 ounces of wax or approximately 55.1% by weight. A 108 ounce log would include approximately 43.13 ounces of paper or 39.9% by weight and 64.87 ounces of wax or approximately 60.1% b weight.

A log made according to this invention with a 55% to 68% wax base will sustain a flame for approximately three hours. Minimal ash will remain after the log is consumed and the flame extinguishes.

The elongated pieces of shredded paper being entangled and enmeshed with each other and further bound together with wax results in a log which is not only structurally rigid and durable for handling, but which is also safe to use for burning in fireplaces. The additional rigidity and integrity of structure derived from the entangled and enmeshed shredded paper particles is maintained to some extent throughout most of the burning process. Consequently, the logs can be moved about and stoked in the fireplace without substantial disintigration. Also, if a burning log should fall out of the fireplace, it could be readily picked up and returned to the fireplace with tongs or the like. Thus the synthetic fireplace logs produced in accordance with this invention have an added degree of safety.

Although the present invention has been described with a certain degree of particularity, it is understood that the present disclosure has been made by way of example and that changes in details of structure, steps, or composition may be made without departing from the spirit thereof.

What is claimed is:

1. In a compactor machine adapted for fabrication of synthetic fireplace logs including an elongated compaction chamber, a compactor and a hopper for feeding raw material into said compaction chamber, and a guillotine cutter for cutting extruded material into predetermined lengths, the improvement comprising:

wax delivery ports at spaced intervals in said compaction chamber for delivery of hot, molten wax into said compaction chamber; and wax injection means communicating with said wax delivery ports for injecting molten wax under pressure through said delivery ports and into said compaction chamber.

2. The improvement of claim 1 including a cooling area associated with said compaction chamber where said wax is cooled and hardened with said raw material, and artificial cooling means comprising a tube coiled around said cooling area and a refrigerant fluid in said coiled tube.

3. The improvement of claim 1 including a core member in said compaction chamber for forming a longitudinal hole in the extruded synthetic logs, said core member comprising a shaft mounted at one end at the front of said compaction chamber with the opposite end of said shaft extending longitudinally through a portion of said compaction chamber.

4. The improvement of claim 1, wherein a sleeve encloses the portion of said compaction chamber which contains said delivery ports, all points on said sleeve being in diametrical spaced relation apart from said compaction chamber, and the ends of said sleeve being sealed to said compaction chamber thereby defining a compression chamber in which the hot, molten wax from said wax injection means is distributed to said delivery ports in said compaction chamber for injection into the synthetic log being formed in said compaction chamber.

5. An apparatus for fabricating synthetic fireplace logs by a continuous extrusion process, comprising:
   an open-ended compaction chamber adapted for receiving raw material in one end and continuously extruding said raw material in a compacted state out its opposite end,
   a compactor associated with said one end of said compaction chamber capable of continuously feeding a dry, raw material into said one end of said compaction chamber,
   wax delivery means in said compaction chamber for uniformly impregnating said compacted raw material with hot, molten wax as said raw material continuously advances through said compaction chamber; and
   a cooling area in said compaction chamber for cooling said mixture of raw material and molten wax, thereby resulting in said mixture acquiring the integrity of a hard, rigid synthetic log structure.

6. The apparatus of claim 5, including cutting means at said opposite end of said compaction chamber for severing said cooled, wax-impregnated, compacted raw material into convenient lengths of synthetic fireplace logs as it is extruded from said compaction chamber.

7. The apparatus of claim 6, wherein said wax delivery means includes wax delivery ports at spaced intervals in a spiral pattern around said compaction chamber, and wherein said wax delivery ports are confined to within a longitudinal length of said compaction chamber approximately equal to the length of said synthetic logs being fabricated, and a pressure injector means connected to said wax delivery ports for feeding wax in pressurized spurts into said compacted raw material through said delivery ports.

8. The apparatus of claim 7, wherein approximately sixteen to twenty of said wax delivery ports are aligned in a spiral pattern with about four loops around said compaction chamber along a longitudinal distance on said compaction chamber of approximately fourteen to sixteen inches.

9. The apparatus of claim 7, including length sensor control means in contact with the synthetic log being extruded and being connected with said cutting means and said pressure injector means for simultaneously activating said cutting means and said pressure injector means whereby the amount of wax impregnated in said raw material is coordinated with the length of the synthetic logs being produced.

10. The apparatus of claim 5 including a core member extending from said one end of said compaction chamber through a portion of the length of said compaction chamber along the longitudinal axis of said compaction chamber for excluding any of said raw material or wax from occupying the space occupied by said core member, thereby resulting in a hollow core in the finished synthetic log.

11. The apparatus of claim 10, wherein said compaction chamber includes a screw comprised of a drive shaft and flighting spirally wound around and attached to said drive shaft, and an extension of said drive shaft in said compaction chamber defining said core member.

12. A method of producing synthetic fireplace logs, comprising the steps of:
   feeding shredded paper into a compactor;
   compacting said shredded paper into an elongated chamber with an opening at each end and with an inside cross-sectional configuration conforming to the desired finished shape of said log;
   injecting hot, molten wax into said compacted paper in said compaction chamber; and
   cooling and hardening said wax while said paper and wax mixture is still in said compaction chamber to form a solid, homogenous member.

13. The method of claim 12 wherein said paper is continuously compacted into one end of said compaction chamber, said wax is injected into said compacted paper and cooled in said compaction chamber, and said log is continuously extruded out the opposite end of said compaction chamber.

14. The method of claim 13 including the step of cutting said continuously extruded log into convenient lengths for use as fireplace logs.

15. The method of claim 14, wherein said wax is intermittently injected in spurts into lengths of said compacted paper in said compaction chamber corresponding to the length of the logs being cut, including the step of coordinating the timing of said spurts with said cutting of said logs.

16. The method of claim 12 wherein said paper is compacted into said compaction chamber around a core member mounted at one end and extending along the longitudinal axis of said compaction chamber for excluding said paper from the space occupied by said shaft, thereby forming a log with a ventilating hole through its longitudinal axis.

17. The method of claim 12 including the additional step of adding a relatively small percentage of pulverized paper to said shredded paper to increase the weight and density of said log for optimum burning and lasting effect.

18. The method of claim 12 wherein the individual pieces of said shredded paper are entangled and enmeshed together and compacted to an approximate density of 0.140 to 0.212 ounces per cubic inch.

19. The method of claim 18 wherein sufficient wax is injected into said paper to result in a fireplace log with a total density of approximately 0.350 to 0.400 ounces per cubic inch.

20. The method of claim 12 wherein approximately 43.13 ounces of paper is compacted into said compaction chamber and approximately 52.87 ounces of wax is injected into said paper for each log produced.

21. The method of claim 12 wherein approximately 43.13 ounces of paper is compacted into said compaction chamber and approximately 64.87 ounces of wax is injected into said paper for each log produced.

* * * * *